UNITED STATES PATENT OFFICE.

JOHN H. NOLAN, OF BOSTON, MASSACHUSETTS.

FIREPROOFING COMPOSITION.

SPECIFICATION forming part of Letters Patent No. 289,022, dated November 27, 1883.

Application filed February 10, 1883. (No specimens.)

*To all whom it may concern:*

Be it known that I, JOHN H. NOLAN, a citizen of the United States, residing at Boston, in the county of Suffolk and State of Massachusetts, have invented certain new and useful Improvements in Fire-Proof Compositions; and I do hereby declare that the same are fully described in the following specification.

This invention relates to improvements in fire-proof compositions, and it is especially well adapted as a fire-proof lining for safes, vaults, cash-boxes, and similar objects, although it is equally well adapted for other purposes where a fire-proof material is required.

The composition consists of asbestus in its natural form, carrying magnesia or other refractory matter, which is ground or pulverized and mixed with marl or its equivalent—such as talc, gypsum, or material of a kindred nature—in about the following proportions, viz: from one-half to three-fourths of asbestus, as aforesaid, and from one-half to one-fourth of marl, or its equivalent, all the ingredients being properly ground or pulverized before being mixed together. When less fire-proof resistance is sufficient for the object sought to be attained, the amount of asbestus may be reduced and the other material or materials increased proportionally. After the asbestus and the other ingredients have been well mixed together, I saturate the mixture in a solution of silicate of soda, or its equivalent, such as chloride of calcium, or alum, or borax, or tungstate of soda, singly or combined, or solutions of a kindred nature.

The asbestus compound, after being properly saturated with the solution or solutions aforesaid, forms a more or less pasty composition, which is well adapted for filling safe or vault walls and doors, and when so applied it forms a strongly fire-proof and fire-resisting material. If so desired, the composition may be made stiff enough to allow it to be molded in the form of tiles or bricks, which are allowed to set and harden; or it may be made sufficiently liquid to admit of its being applied by means of a brush to the surface of the object that is to be made fire-proof.

This improved composition, besides being fire-resisting, is also an excellent non-conductor for heat, and it may therefore to great advantage be used as a non-conductor of heat wherever such use of it may be desired.

Having thus fully described my invention, I wish to secure by Letters Patent and claim—

The herein-described fire-proof composition, consisting of asbestus and marl or its equivalent, ground and mixed in the proportions as specified, and saturated in silicate of soda or its described equivalent, as hereinabove set forth and specified.

In testimony whereof I have affixed my signature in presence of two witnesses.

JOHN H. NOLAN.

Witnesses:
ALBAN ANDRÉN,
HENRY CHADBOURN.